United States Patent [19]

Uchida et al.

[11] Patent Number: 4,820,238
[45] Date of Patent: Apr. 11, 1989

[54] UNIVERSAL JOINT HAVING A FLEXIBLE BOOT

[75] Inventors: Susumu Uchida, Susono; Satoru Konishi, Gotenba, both of Japan

[73] Assignee: Keeper Co., Ltd., Tokyo, Japan

[21] Appl. No.: 80,974

[22] Filed: Aug. 3, 1987

[30] Foreign Application Priority Data

Feb. 27, 1987 [JP] Japan .................. 62-44804

[51] Int. Cl.$^4$ ............................................. F16D 3/84
[52] U.S. Cl. ................. 464/15; 277/212 FB; 464/175; 464/906
[58] Field of Search ............. 277/3, 212 FB; 464/7, 464/15, 145, 146, 173, 175, 906

[56] References Cited

U.S. PATENT DOCUMENTS 3,858,412  1/1975  Fisher et al. ............... 464/175 X
4,210,002  7/1980  Dore ........................ 464/175
4,224,808  9/1980  Gehrke ..................... 464/175
4,392,838  7/1983  Welschof et al. ........... 464/175
4,559,025 12/1985  Dore ........................ 464/175

FOREIGN PATENT DOCUMENTS 2717029 10/1978  Fed. Rep. of Germany ........ 464/15

Primary Examiner—Daniel P. Stodola
Attorney, Agent, or Firm—Wegner & Bretschneider

[57] ABSTRACT

A universal joint provided with a joint body having an inner ring disposed at one end of a first shaft and an outer ring disposed at one end of a second shaft, and a flexible boot fitted at its opposite ends to said outer ring and the first shaft. Inside the flexible boot is formed a sealed space in which grease for lubricating the joint body is enclosed and which is charged with nitrogen gas.

6 Claims, 3 Drawing Sheets

UNIVERSAL JOINT HAVING A FLEXIBLE BOOT

BACKGROUND OF THE INVENTION

1. Field of the Invention

This invention relates to a universal joint for use in a power transmitting system for a vehicle or the like.

2. Description of the Prior Art

An example of this type of universal joint has been known which is provided with a joint body having an inner ring disposed at one end of a first shaft and an outer ring disposed at one end of a second shaft, and a flexible boot formed from a high elasticity material such as rubber or resin and fitted at its opposite ends to the outer ring and the first shaft. In this universal joint, grease for lubricating the joint body is enclosed inside the flexible boot, and a sealed space which is charged with air is formed in the flexible boot. The flexible boot retains the grease in a sealed manner and functions to prevent any dust or water from entering into the sealed space from the outside.

The rubber or resin which form the above flexible boot are materials having a gas-permeable property, and the rate of gas permeation through such material increases in response to any increase in the pressure differential between the inside and the outside surfaces of the material and to any rise in temperature. Therefore, in the above-described type of conventional universal joint having a sealed space charged with air, when the internal pressure of the sealed space is increased due to heat evolution from the joint caused when the joint moves or due to a rise in the ambient temperature, air in the sealed space escapes to the outside by permeating through the flexible boot. As the temperature of the joint decreases after movement of the joint ceases, a phenomenon occurs whereby outside air enters the sealed space by permeation through the flexible boot. As described above, the rate of gas permeation increases in response to any rise in temperature, and the gas permeation rate displayed when the joint temperature is low during the time when the universal joint is in a stationary state is very much smaller than that displayed when the joint temperature is high at the time when the universal joint is in a state of movement. Consequently it takes a much longer time for a certain volume of air to enter the sealed space compared with the time taken for the same quantity of air to escape from the sealed space. Accordingly, as the operations of moving and stopping the universal joint are repeated, the internal pressure of the sealed space decreases gradually, and the bellows portion of the flexible boot is correspondingly deformed inwardly in the diametral direction. If the operations of moving and stopping the universal joint are further repeated while the flexible boot is being deformed in this way, there is a risk of the inner end of the inwardly deformed portion being nipped in the joint body and thereby being damaged.

In the conventional universal joint whose sealed space is charged with air, there is also a problem of the grease enclosed in the sealed space deteriorating due to chemical reaction between the grease and oxygen in the air, along with a problem whereby the extent of the above-described deformation of the flexible boot is further increased as the negative pressure in the sealed space decreases due to the reduction in the volume of air brought about by the above reaction and by absorption of oxygen by the material of which the flexible boot is made.

SUMMARY OF THE INVENTION

It is an object of the present invention to provide a universal joint which is free from the above-described problems of the conventional universal joint.

To this end, the present invention takes notice of the fact that the rate of gas permeating through a material such as rubber or resin, the rate of absorption of gas by this material, and the reactivity between gas and grease vary in accordance with the kind of gas being utilized, and provides a universal joint of the above-described type having a sealed spaced charged with nitrogen gas which does not easily permeate through the flexible boot, does not exhibit a tendency to be absorbed by the material of which the flexible boot is made and does not chemically react with grease.

In the universal joint in accordance with the present invention, the volume of nitrogen gas which escapes from the sealed space to the outside by permeating through the boot while the joint is being repeatedly moved and stopped and the volume of nitrogen gas absorbed by the constituent material of the flexible boot are extremely small and, therefore, the extent to which inward deformation of the flexible boot occurs due to reduction in the internal pressure of the sealed space is limited. If chloroprene is used as the material for forming the flexible boot, the rate at which nitrogen gas will permeate through this material is about $\frac{1}{3}$ that of oxygen gas under conditions of constant pressure and constant temperature, and the rate at which air will permeate through the same material is 7/15 that of oxygen gas. Therefore, the rate of nitrogen gas escaping from the sealed space to the outside is extremely small compared with air, and there is no possibility of the internal pressure of the sealed space being greatly reduced. Also there is no possibility of grease deteriorating due to chemical reaction with nitrogen gas.

DESCRIPTION OF PREFERRED EMBODIMENT

Figure 1:
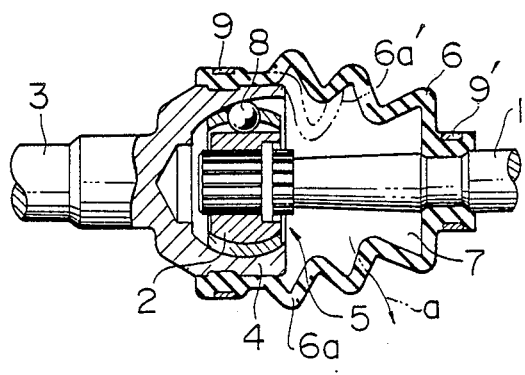
FIG. 1 is a cross-sectional view of a universal joint which represents an embodiment of the present invention.
Figure 2:
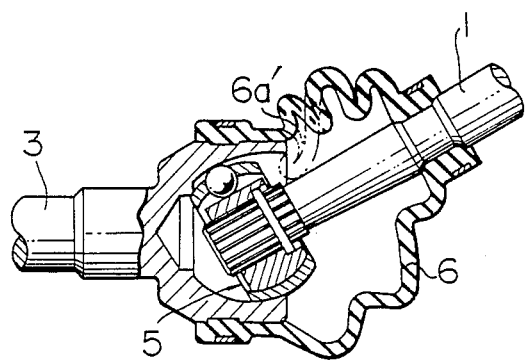
FIG. 2 is a cross-sectional view of the universal joint shown in FIG. 1 which illustrates the state thereof when the first and second shafts are relatively displaced so as to form a predetermined angle therebetween.

FIGS. 1 and 2 show a universal joint which represents an embodiment of the present invention which is provided with a joint body 5 having an inner ring 2 disposed at one end of a first shaft 1 and an outer ring 4 disposed at one end of a second shaft 3, and a flexible boot 6 whose opposite ends, between which is formed bellows portion 6a, are respectively fitted to the outer ring 4 and the first shaft 1. Inside the flexible boot 6 is formed a sealed space 7 which encloses grease which serves to lubricate the joint body 5 and which is charged with nitrogen gas. FIGS. 1 and 2 also show torque transmitting balls 8 disposed between the inner ring 2 and the outer ring 4, and annular fastening bands 9 and 9'.

In the construction of the illustrated universal joint, the sealed space 7 is charged with nitrogen gas, as mentioned above. Therefore, even if the operations of moving and stopping the universal joint are repeated and the temperature of the joint is thereby repeatedly raised and lowered, the rate of nitrogen gas released from the sealed space 7 by permeating through the flexible boot 6 as indicated by the arrow a in FIG. 1 is very small, and the amount of nitrogen gas absorbed by the material of the boot is also very small. There is therefore no possibility of the internal pressure of the sealed space 7 being greatly reduced and no possibility of the bellows portion of the flexible boot collapsing in the diametral direction, as indicated by the chain line 6a' in FIG. 1. It is therefore possible to prevent any damage of the flexible boot due to collapse of the bellows portion. That is, if the flexible boot collapses as indicated by the chain line 6a', there is a risk of the radial inner end of a collapsed portion of the flexible boot being nipped or bitten in the joint body 5 between the first shaft 1 and the joint body 5 when, as shown in FIG. 2, the first shaft 1 of the universal joint is moved to a position in which it forms a predetermined angle between itself and the second shaft 3, resulting in a damage of the flexible boot. However, the flexible joint embodying the present invention as illustrated is free from any damage of this kind.

Figure 3:
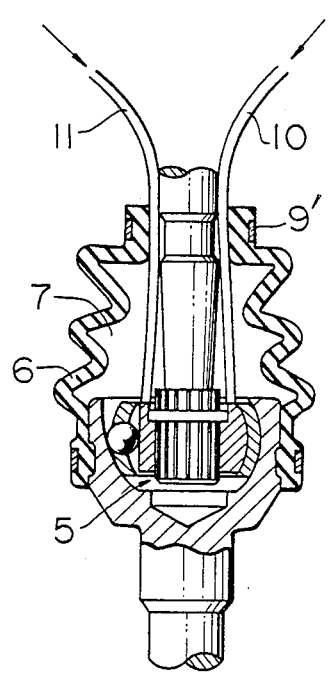
FIG. 3 is an illustration of a method of injecting nitrogen gas and grease into the sealed space of the universal joint shown in FIG. 1.

The process of injecting nitrogen gas and grease into the sealed space 7 is effected, for example, as shown in FIG. 3. That is, in this example, the universal joint is fixed such that the large-diameter end of the flexible boot 6 is located below the small-diameter end. Then, a nitrogen injecting nozzle 10 and a grease injecting nozzle 11 are inserted into the sealed space 7 from the small-diameter end until the lower ends of these nozzles reach positions in the vicinity of the joint body 5. In this state, nitrogen gas is injected into the sealed space 7 through the nitrogen injecting nozzle 10, and grease is thereafter injected through the grease injecting nozzle 11. If they are injected in this manner, the air which existed in the sealed space 7 before the injecting operation was performed is expelled upwardly during the injection of nitrogen gas and is discharged to the outside, since the specific gravity of air is smaller than that of nitrogen. When the grease is thereafter injected, a certain volume of gas existing at an upper part of the sealed space 7 is also expelled from the sealed space 7 and, therefore, almost all the air existing in the sealing space is replaced with nitrogen gas by the time when the injecting operation is completed. After the completion of the injecting operation, the nozzles 10 and 11 are taken out and the fastening band 9' is tightened.

Figure 4:
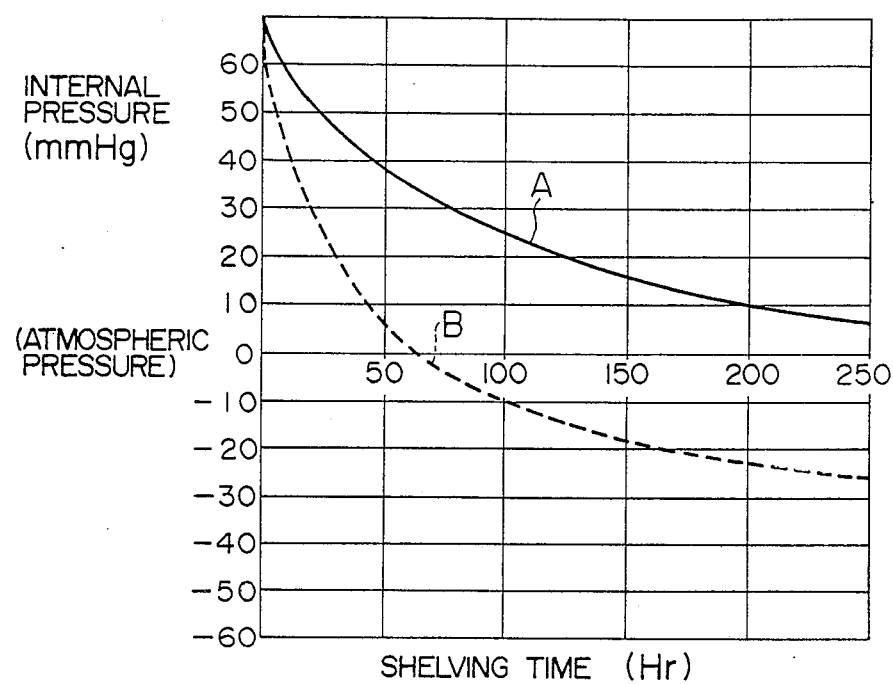
FIG. 4 is a graph in which the present invention and the prior art are compared with respect to the relationship between the internal pressure of the sealed space and the shelving time displayed when the universal joint is left under high-temperature conditions.

FIG. 4 is a graph showing th relationship between the change in the internal pressure of the sealed space 7 and the shelving time displayed when the universal joint is left in a high-temperature atmosphere. This graph has been obtained on the basis of experiments performed by the present inventor. In the experiment, the universal joint was left in a thermostatic oven at 100° C., and the relationship between the passage of time, namely, the shelving time (hours) and the internal pressure (mmHg) of the sealed space was obtained. In this graph, curve A represents the result obtained by testing the universal joint in accordance with the present invention in which the sealed space is charged with nitrogen gas, and the curve B represents the result obtained by testing a conventional universal joint in which the sealed space is charged with air. As will be understood from the results shown in FIG. 4, in the universal joint in accordance with the present invention, the rate of reduction in the internal pressure is not large, and the internal pressure does not decrease below atmospheric pressure. In contrast, the internal pressure of the sealed space in the conventional universal joint decreases rapidly, becomes equal to the atmospheric pressure after 65 hours and then becomes negative, the degree of negative pressure gradually increasing with the passage of time. Basically, it is not possible for the internal pressure to be reduced to a negative pressure region, that is, below the atmospheric pressure, but it is thought that, in the conventional universal joint, oxygen in the air reacts with grease and is considerably absorbed by the material of which the flexible boot is made so that the amount of oxygen in the sealed space is reduced, thereby generating a negative pressure which gradually increases.

As is clear from the above description, the flexible joint in accordance with the present invention is free from the risk of the flexible boot being damaged due to the inward deformation thereof in the diametral direction caused when the internal pressure of the sealed space is seriously lowered and is also advantageous in that grease in the joint does not tend to deteriorate.

What is claimed is:

1. A universal joint, comprising:
   a joint body having an inner ring disposed at one end of a first shaft;
   an outer ring disposed at one end of a second shaft, said inner ring being operatively disposed in said outer ring; and
   a flexible boot fitted at its opposite ends to said outer ring and said first shaft, respectively, to define a sealed space therein, said sealed space enclosing grease for lubricating said joint body and being charged with nitrogen gas.

2. The universal joint as in claim 1, wherein said flexible boot is made of a material having the characteristic such that nitrogen gas permeates therethrough at a rate of approximately one-third that of oxygen gas at constant pressure and temperature but substantially less than the rate at which air permeates therethrough at constant pressure and temperature.

3. The universal joint as in claim 2, wherein said rate at which air permeates therethrough is seven-fifteenths that of oxygen gas at constant pressure and temperature.

4. The universal joint as in claim 1, wherein said flexible boot is made of a material having the characteristic such that nitrogen gas permeates therethrough at a rate of at least approximately five-sevenths that of air at constant pressure and temperature.

5. The universal joint as in claim 1, wherein said flexible boot is made of chloroprene rubber.

6. The universal joint as in claim 1, wherein said flexible boot is made of a material having the characteristic of substantially slow permeation to nitrogen gas relative to permeation to oxygen gas and air.

* * * * *